Figure 1:
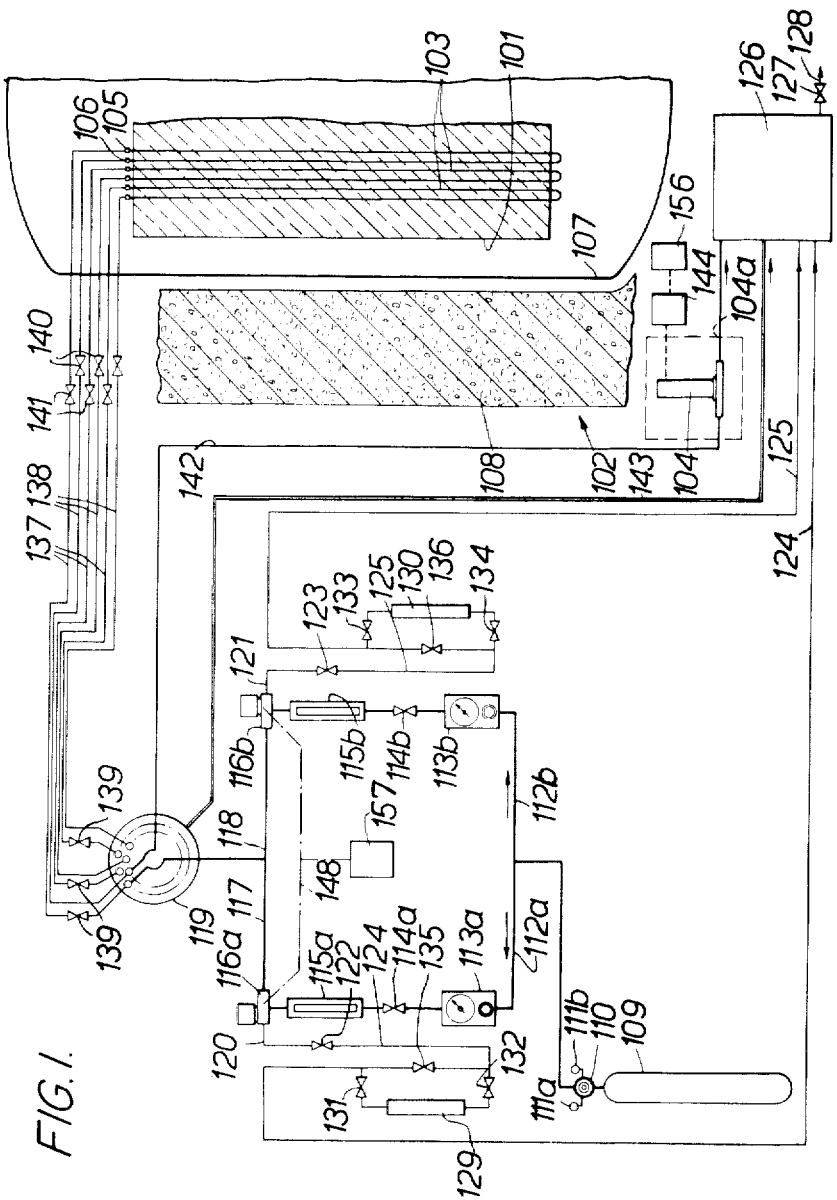

United States Patent Office 3,234,385
Patented Feb. 8, 1966

3,234,385
APPARATUS FOR DETERMINING NEUTRON FLUX DISTRIBUTION IN A NUCLEAR REACTOR CORE
Ronald Hugh Campbell, Bowdon, England, assignor to United Kingdom Atomic Energy Authority, London, England
Filed Jan. 3, 1963, Ser. No. 249,246
Claims priority, application Great Britain, Jan. 11, 1962, 20,181/59
3 Claims. (Cl. 250—83.1)

This invention relates to nuclear reactors, and in particular to a method of and means for determination of neutron flux distribution in the core of a nuclear reactor (hereinafter referred to as "flux scanning") and is a continuation-in-part of my U.S. patent application Serial No. 33,453, filed June 2, 1960.

In order to obtain a complete picture of flux distribution in the core of a nuclear reactor, both longitudinal and lateral distribution must be determined. Lateral distribution can readily be measured by scanning at different positions across the core. Longitudinal distribution can likewise be measured by scanning at different positions along the length of the core.

Known methods of flux scanning, whilst useful for low powered or research reactors, have not been fully proved for operation in highly rated power-producing reactors where the core is at high tempeature. These methods include scanning by an ion chamber lowered into an access hole, and scanning by monitoring isotope formation in a wire exposed to irradiation in the core, the produced isotope having a suitable half-life period, and the wire being lowered into an access hole in the core where it undergoes irradiation and is then withdrawn for monitoring. Serious practical problems arise in the use of these methods where determination of a distribution in one direction with respect to the core necessitates using a non-vertical access hole, in particular a horizontal hole where the fuel element channels and control rod holes in the core are vertical, because in the case of ion chamber scanning, the holes need to be of substantial diameter and are difficult to provide, and in the case of wire scanning, lack of gravity feed makes the placing in position of the wire difficult and furthermore rubbing and contamination of the wire makes readings unreliable.

It is an object of the invention to provide a method of and means for flux scanning which is simple, reliable and which can produce readings of both longitudinal and lateral distribution.

In the parent application there is described and claimed a method of measuring the distribution of flux in the core of a nuclear reactor comprising the successive steps of introducing a filament of gas into a small bore tube extending through the reactor core, irradiating the filament of gas in the core for a period, subjecting the filament to a change in velocity, removing the filament from the tube within the core, and measuring the distribution of activity in the gas along the filament.

According to the present invention, in apparatus for determining neutron flux distribution in a nuclear reactor core and comprising a small bore tube extending through the reactor core, means for introducing a filament of fluid into the tube for irradiation in the core, means for removing the filament of fluid after irradiation, and means for measuring the distribution of activity in the fluid along the filament, there is provided the improvement comprising members of neutron absorbing material spaced along said tube to effect local changes in the density of the ambient neutron flux.

Distribution across the core can be obtained by measuring the activity of fluid passed at a steady flow rate through the core at a number of different positions across the core.

Alternatively, lateral distribution may be obtained by passing the filament of gas laterally across the core.

Differentiation to obtain lateral distribution may be accomplished graphically or mechanically.

Mechanical differentiation may be effected by recording the output of a tachogenerator driven by a motor employed for driving the activity recorder, thereby measuring the rate of change of the readings indicated by the activity recorder.

Figure 2:
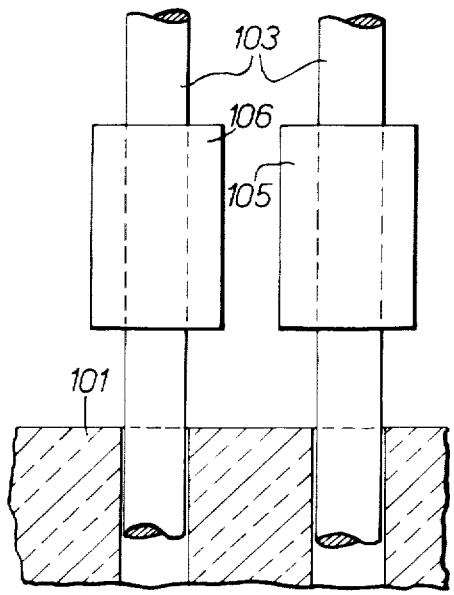
Figure 3:
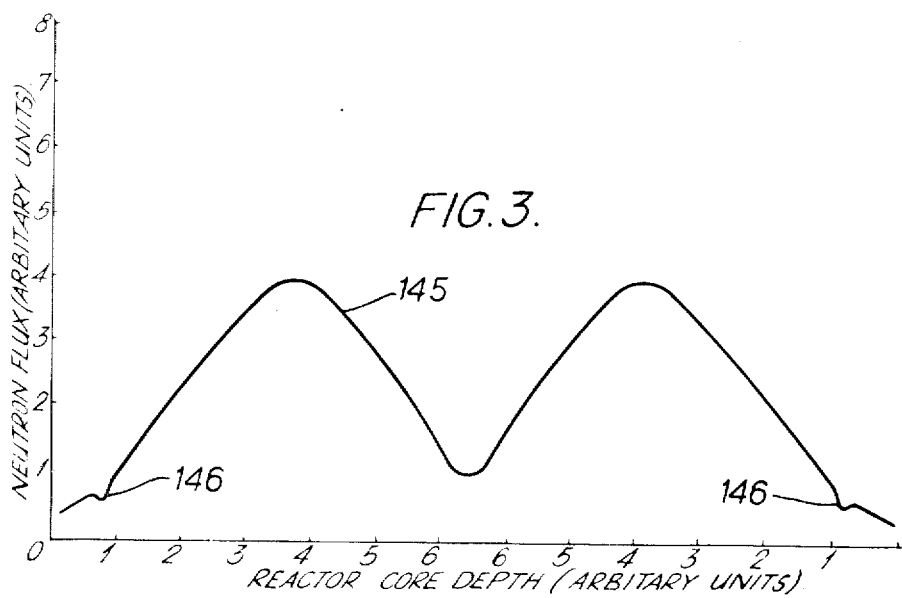

An embodiment of the invention will now be described by way of example with reference to the accompanying diagrammatic drawings, wherein:

FIGURE 1 is a diagrammatic illustration of the embodiment,
FIGURE 2 is an enlarged detail of FIGURE 1, and
FIGURE 3 is a flux plot showing flux distribution.

Referring to FIGURES 1 and 3, distribution of neutron flux in the graphite core 101 of a gas-cooled, graphite moderated nuclear reactor 102 is determined by introducing fourteen filaments of argon gas into the core by way of fourteen small (.125 in.) bore U tubes 103 of stainless steel distributed on a lattice through the core 101, irradiating the filaments of fluid in the core for a period, subjecting the filaments to a change in velocity, removing the filaments from the core sequentially and then passing each of the filaments in turn through a monitor 104 (and by way of a line 142) to measure the distribution of activity along the filaments, the change in velocity of the filaments occurring between regions where the density of the ambient flux is subjected to a localised change by collars 105, 106 of a neutron absorbing material (boron steel) attached to the tubes 103 adjacent the core entry and exit points of the filament (see FIGURE 2). The monitor 104 incorporates a photomultiplier and phosphor and is screened from background radiation by shielding 104a. Light signals resulting from beta and gamma bombardment of the phosphor are fed by the photomultiplier to a unit 144 consisting of a pre-amplifier, an amplifier and a counter. The counts are recorded on a pen and chart recorder 156, the pen of the recorder being driven by a motor and moving with a displacement proportional to the activity measured by the unit 144.

The reactor core 101 is contained in a pressure vessel 107 and is cooled by pressurised $CO_2$ gas circulated in a closed circuit. The pressure vessel 107 is enclosed in concrete biological shielding 108.

The argon gas is stored under pressure in a cylinder 109 and is released through a pressure reducing valve 110 with pressure gauges 111a, 111b, into a two-limb network 112a, 112b. Limb 112a is provided with a flow regulating valve 113a, a variable flow restrictor 114a, a rotameter type flow meter 115a and a two-way solenoid-operated valve 116a. Limb 112b is provided with similar components 113b, 114b, 115b and 116b respectively. Outlets 117, 118 of the valves 116a, 116b combine to provide a common inlet to a twenty-one way selector valve 119. Outlets 120, 121 of the valves 116a, 116b discharge through "dummy" flowlines 124, 125 to a chamber 126. The dummy lines 124, 125 have variable resistances 122, 123. The line 142 is connected to the outlet of the selector valve 119. After passage through the line 142 and monitor 104, gas discharged from the outlet of the selector valve 119 passes into the chamber 126. Gas discharged to the chamber 126 is released to the atmosphere through a line 128 provided with a flow control valve 127. The valve 127 is adjusted to maintain a constant pressure in the chamber 126.

Bubble-type flow meters 129, 130 are connected in parallel with the dummy lines 124, 125. The flow meters are used for calibration purposes only and are normally closed off from the dummy lines 124, 125 by isolation valves 131, 132, 133, 134. When argon gas discharged through the lines 124, 125 is required to flow through the flow meters 129, 130, the isolation valves are opened and throttle valves 135, 136 (normally fully open) are adjusted to induce flow through the flow meters.

Flow lines 137, 138 connect the tubes 103 in the core 101 with the selector valve 119. Gas is conducted to the tubes 103 at about 2 p.s.i. by way of the lines 137 and returned to the valve 119 by way of the lines 138. The lines 137 have calibration valves 139 and isolation valves 140. The lines 138 have isolation valves 141. The valves 116a, 116b may be operated simultaneously by a controller 157 through a signal line 148, the arrangement being such that valve 116a opens to connect the limb 112a with the selector valve 119 as valve 116b opens to connect the limb 112b with the dummy line 125. Similarly, valve 116b opens to connect the limb 112b with the selector valve 119 as valve 116a opens to connect the limb 112a with the dummy line 124. Alternatively, either of the valves 116a, 116b can be operated independently of the other.

In the event of failure of a tube 103, with a consequent risk of damage to the system by inflowing reactor coolant, pressure build-up is limited by a large (.5 in.) bore vent line 143 connecting the selector valve 119 with the chamber 126. The offending tube 103 can then be isolated by the valves 140, 141.

Before operation, the system is calibrated in the following manner. All valves 139, 140, 141 are opened fully and valve 114a is closed. With the valve 116b open to the selector valve 119, and the valve 119 connected to one of the tubes 103, gas is then discharged from the cylinder 109 into the selected tube 103 at a flow rate of 10 inches/second, using the flowmeter 115b. The selector valve 119 is next operated to pass gas through each of the remaining tubes 103 in turn and their respective flow rate measured. The tube 103 with the lowest flow rate (i.e. the highest resistance) is reconnected to the limb 112b and the flow rate through the limb 112b is adjusted to 10 inches/second by means of the valves 113b and 114b. The valve 116b is then connected with the dummy line 125 and, with the aid of the flowmeter 130, the valve 123 is adjusted until the flow rate through the line 125 is 10 inches/second also. The valve 116b is then reconnected with the selector valve 119 and each of the remaining tubes 103 calibrated to allow a flow rate of 10 inches/second, using the valves 139. The resistances of all the tubes 103 are now equal to each other and to the resistance of the dummy line 125.

The valve 116a is now connected with one of the tubes 103 and the valve 116b connected with the dummy line 125. The valve 114a is opened and the valves 113a, 114a adjusted until the flow rate through the limb 112a (and hence the selected tube 103) is 1 inch/second. The valve 116a is next connected with the dummy line 124 and, with the aid of the flowmeter 129, the valve 122 is adjusted to provide a flow rate of 1 inch/second through this line also.

In operation, to use a "soak" method of determining neutron flux distribution in the reactor core 101 only one of the limbs 112a, 112b is employed. Assuming the limb 112a to be chosen, the valve 116b in the limb 112a is secured in the closed position and the valve 116a in the limb 112a is maintained open to allow a constant flow of argon gas to pass from the cylinder 109 to the selector valve 119. The selector valve 119 is next operated to fill each of the fourteen tubes 103 in turn. As the filling of the tubes 103 proceeds, the filaments of gas in the tubes are subjected to irradiation by the neutron flux of the reactor core 101. Irradiation of the argon results in the conversion of the isotope $A^{40}$ present in the gas (argon gas consists of about 99.6% of the isotope $A^{40}$) to the radioactive isotope $A^{41}$ which has a half-life decay period of 110 minutes. Gas in the region of the neutron-absorbing collars 105, 106 is subjected to less irradiation as the density of the ambient flux is reduced by the presence of the collars.

Operation of the selector valve 119 is continued after all of the tubes 103 have been filled, so that the initial fillings of gas are displaced by the admission of further fillings. The displaced filaments of gas are moved in turn past the monitor 104 which measures activity along their lengths, the regions of high activity corresponding to regions of high flux density in the reactor core 101. Axial diffusion of the gas is limited by the small bores of the tubes 103. The activity measurements are recorded on charts by the recorder 156. FIGURE 3 shows a typical flux plot obtained on such a chart, wherein the curve 145 traces flux distribution in the reactor 102. The curve 145 clearly shows localised depressions 146, 147 created by the presence of the collars 105, 106 and, when compared with a base scale of the core dimensions, readily indentifies selected points with corresponding regions of the reactor core. The double curve 145 is caused by the U shape of the tube 103.

To use a "step" method of determining neutron flux distribution in the reactor core 101, both of the limbs 112a, 112b are employed.

With gas flowing from the cylinder 109, the valves 116a, 116b are operated to simultaneously connect the limbs 112a with the selector valve 119 and the limb 112b with the dummy line 125. With the selector valve 119 open to one of the tubes 103, argon gas then flows at a low rate (1 inch/second) through the limb 112a into the selected tube 103. The valves 116a, 116b are then operated to connect simultaneously the limb 112b with the selector valve 119 and hence with the selected tube 103 and to connect the limb 112a with the dummy line 124. Gas then flows at a high rate (10 inches/second) through the limb 112b and into the tube 103. (Simultaneous operations of the valves 116a, 116b and the use of the dummy lines 124, 125 allow an uninterrupted flow of gas through the limbs 112a, 112b and tube 103.) The filament of gas passing out of the selected tube 103 is then monitored for activity by the monitor 104 and the activity readings recorded by the recorder 156. The above operations are repeated to pass gas through the remaining tubes 103. Distribution of activity along each filament of gas passing out of a tube 103 is then differentiated with respect to the length of the filament in order to obtain a measurment of flux distributions in the reactor core 101. The flux plot obtained is similar to that shown in FIGURE 3.

Differentiation can be accomplished graphically or mechanically. Mechanical differentiation may be conveniently achieved by translating the pen displacement of the recorder 156 into a rate of change of activity. This can be done by coupling the driving motor of the pen with a tachogenerator, and feeding the output of the tachogenerator into an amplifier/recorder unit.

The tubes 103, being vertically orientated, provide information on axial (longitudinal) distribution of neutron flux only. Radial (horizontal) distribution of neutron flux can, however, be obtained by comparison of the axial distributions. Alternatively, the reactor 102 can be provided with further tubes 103, horizontally orientated. The alternative arrangement is preferred.

Fluids other than argon gas may be used, as long as they are activatable by neutrons, for example, $SO_2$ and $H_2S$. These last-mentioned gases are, however, corrosive at reactor temperatures and the material of the system must be carefully selected.

I claim:

1. In apparatus for determining neutron flux distribution in a nuclear reactor core comprising a small-bore tube extending through the reactor core, means for introducing a filament of fluid into the tube for irradiation in the core, means for removing the filament of fluid after irradiation, and means for measuring the distribution of activity in the fluid along the filament, the improvement comprising members of neutron-absorbing material spaced along said tube to effect local changes in the density of the ambient neutron flux.

2. Apparatus as set forth in claim 1 wherein said members of neutron-absorbing material are located at the points of entry and exit of the tube to and from the core.

3. Apparatus as set forth in claim 2 wherein said tube is in the form of a U between said points of entry and exit.

References Cited by the Examiner
UNITED STATES PATENTS

| | | | |
|---|---|---|---|
| 2,461,877 | 2/1949 | Brereton | 204—193 |
| 2,741,592 | 4/1956 | Borst et al. | 250—83.1 X |
| 3,035,173 | 5/1962 | Miramond et al. | 250—83.6 |
| 3,084,251 | 4/1963 | Goupil | 250—83.6 |

RALPH G. NILSON, *Primary Examiner.*

ARCHIE BORCHELT, *Examiner.*